US008926941B2

(12) United States Patent
Jadhav

(10) Patent No.: US 8,926,941 B2
(45) Date of Patent: Jan. 6, 2015

(54) CAPTURE OF $CO_2$ FROM HYDROGEN PLANTS USING A TEMPERATURE SWING ADSORPTION METHOD

(71) Applicant: Raja A. Jadhav, Benicia, CA (US)

(72) Inventor: Raja A. Jadhav, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/843,697

(22) Filed: Mar. 15, 2013

(65) Prior Publication Data

US 2014/0186255 A1 Jul. 3, 2014

Related U.S. Application Data

(60) Provisional application No. 61/747,778, filed on Dec. 31, 2012.

(51) Int. Cl.

| | |
|---|---|
| ***C01B 3/24*** | (2006.01) |
| ***C01B 31/20*** | (2006.01) |
| ***C01B 3/38*** | (2006.01) |
| ***B01D 53/04*** | (2006.01) |
| ***C01B 3/50*** | (2006.01) |

(52) U.S. Cl.

CPC ................. *C01B 31/20* (2013.01); *C01B 3/382* (2013.01); *B01D 53/0462* (2013.01); *C01B 3/24* (2013.01); *C01B 3/508* (2013.01); *C01B 3/38* (2013.01); *C01B 2203/0233* (2013.01); *C01B 2203/0244* (2013.01); *C01B 2203/0288* (2013.01); *C01B 2203/043* (2013.01); *C01B 2203/0475* (2013.01); *C01B 2203/063* (2013.01); *C01B 2203/0827* (2013.01); *C01B 2203/86* (2013.01); *B01D 2253/102* (2013.01); *B01D 2253/108* (2013.01); *B01D 2253/116* (2013.01); *B01D 2256/16* (2013.01); *B01D 2257/504* (2013.01); *B01D 2259/414* (2013.01)

USPC .......................................................... 423/650

(58) Field of Classification Search

CPC ........................................................ C01B 3/22

See application file for complete search history.

(56) References Cited

U.S. PATENT DOCUMENTS

| | | | | |
|---|---|---|---|---|
| 6,301,873 | B2 * | 10/2001 | Hannemann et al. | ........ 60/39.12 |
| 2005/0201929 | A1 * | 9/2005 | Hershkowitz et al. | ........ 423/652 |
| 2008/0173585 | A1 | 7/2008 | White et al. | |
| 2008/0176174 | A1 | 7/2008 | White et al. | |
| 2010/0024476 | A1 | 2/2010 | Shah | |
| 2010/0080754 | A1 | 4/2010 | Fischer et al. | |
| 2010/0212495 | A1 | 8/2010 | Gadkaree et al. | |
| 2010/0251887 | A1 * | 10/2010 | Jain | ................................. 95/46 |

* cited by examiner

*Primary Examiner* — Melvin C Mayes
*Assistant Examiner* — Kenneth Vaden
(74) *Attorney, Agent, or Firm* — A. Stephen Zavell

(57) ABSTRACT

The invention involves the use of a temperature swing adsorption process in steam methane reforming or autothermal reforming $H_2$-production processes to capture $CO_2$ and produce nearly pure off gas streams of $CO_2$ for sequestration or enhanced oil recovery (EOR). The hydrogen stream output is substantially pure and can be recycled as a fuel to the steam methane reformer furnace or used in other petroleum and petrochemical processes.

14 Claims, 1 Drawing Sheet

100
H2O, O2, N2
16
Steam
10
NG
12
SMR
14
18
HRSG
20
22
HTS/LTS
24
Shifted Sygas
26
34
Air
38
High-press CO2
36
TSA
28
H2 Product
32
High-press CH4
30

CAPTURE OF $CO_2$ FROM HYDROGEN PLANTS USING A TEMPERATURE SWING ADSORPTION METHOD

CROSS-REFERENCE TO RELATED APPLICATIONS

This application claims benefit under 35 USC 119 of U.S. Provisional Patent Application No. 61/747,778 with a filing date of Dec. 31, 2012. In addition, application Ser. No. 61/747,746, filed on Dec. 31, 2012 is also incorporated herein by reference for all purposes.

FIELD OF THE INVENTION

The invention relates to the field of capturing $CO_2$ from a hydrogen plant and in particular capturing $CO_2$ from a process that produces hydrogen for use as a fuel or in petroleum operations.

BACKGROUND OF THE INVENTION

Steam methane reformer (SMR) plants are widely employed in refineries to supply $H_2$ required for various operations. A large amount of $CO_2$ is emitted from these plants. In older style SMR plants, the $CO_2$ is removed from the syngas using a solvent-based process such as an aMDEA (activated methyl diethanol amine). This is a wet removal process and requires replenishment of the medium over time. In more recent style SMR plants, pressure swing adsorption (PSA) units are employed to purify the $H_2$ stream. In both these units, a large amount of $CO_2$ at low concentration and pressure is emitted from the SMR furnace. Capture of this $CO_2$ using a post-combustion amine process technology such as MEA (monoethanolamine) is expensive.

Auto thermal reformer (ATR) units may be used to produce $CO_2$ free $H_2$ stream at reduced costs. Conventionally, the $CO_2$ is removed by using a solvent-based process similar to those processes used in older style SMR plants. Purity of the $H_2$ product, however, is low—about −96 mol % as the product stream contains unconverted $CH_4$ and other impurities, such as $N_2$, Ar, which remain with the $H_2$. The $H_2$ product can be further purified with a PSA system, however, the purge gas results in a loss of valuable $H_2$ and $CH_4$ components.

One recent approach, US 2010/0080754, teaches a method to eliminate the $CO_2$ emissions from the SMR plants by sending the PSA off gas to the SMR as a feed. The PSA bed is regenerated using high pressure (P) and high temperature (T) natural gas and steam and the off gas is sent to the SMR as a high pressure feed. The SMR furnace is fueled by pure $H_2$ product.

SUMMARY OF THE INVENTION

A process and apparatus is described which reduces the $CO_2$ emissions from the SMR and ATR plants while producing high purity $H_2$ product. More specifically, the invention uses two different types of absorbent beds with a first set of beds designed to capture $CO_2$ and a second set of beds designed to capture the other impurities in the gas stream, such as $CH_4$, CO and $N_2$, whereby a higher purity $H_2$ stream is produced (>98 vol. % and more beneficially 99+ vol. % up to 99.9 vol. %.).

DETAILED DESCRIPTION OF THE INVENTION INCLUDING PREFERRED EMBODIMENTS

The process eliminates or reduces the $CO_2$ emissions from an SMR and an ATR plant while producing a high purity hydrogen product. It may also find use in an ATR plant. In this process, two different types of absorbent beds are used—a "first" set of beds captures $CO_2$ and a "second" set of beds captures additional impurities in the synthesis gas stream, such as methane, carbon monoxide and $CO_2$. When these two beds axe arranged in a series, a $H_2$ product of >99.5 mol % purity is obtained. Some of the benefits of the process are—a stream which is nearly 100% pure $CO_2$ is recovered at high pressure ready for compression and sequestration or liquefaction and the $CH_4$ in the synthesis gas stream is recycled as a feed to the reformer at high pressure to further enhance the overall efficiency of the process. Both the "first" and "second" beds are operated in a temperature swing adsorption mode to achieve these results. Suitable temperatures for temperature swing adsorption are from about 20° C. to about 400° C. and preferably from about 40° C. to about 300° C. and pressure from about 150 psi to about 600 psi and preferably about 300 psi to about 500 psi. Preferred cycle time for the TSA is a function of the overall plant operations and desired purity of $H_2$.

The first set of beds is composed of adsorbents which selectively adsorbs $CO_2$. Suitable adsorbents are activated carbon or carbon molecular sieve, which are obtainable from such companies as Ceca/Arkema and Pica Carbon as noted in the Patent Application US 2010/0080754. Other suitable activated carbons axe BPL from Calgon Corporation and NovaCarb series from Mast Carbon International. The adsorbent can be used in a granular form as well as a structured bed form. The second set of beds is composed of an adsorbent which is highly selective for the adsorption of the methane, carbon monoxide, nitrogen and argon impurities. A suitable adsorbent is a zeolite, such as 5 A molecular sieves. Additional shaped zeolites have the 4 A; or 13× structures, or combinations of 4 A; 5 A; and Bx. Both the first and second set of beds has process conditions which are selected to minimize the adsorption of hydrogen in each bed.

The temperature swing adsorption (TSA) apparatus, i.e., reactor, is sized for the volume of hydrogen to be processed. The cycle time is a function of the amount of $CO_2$ and other impurities in the gas stream.

Figure 1:
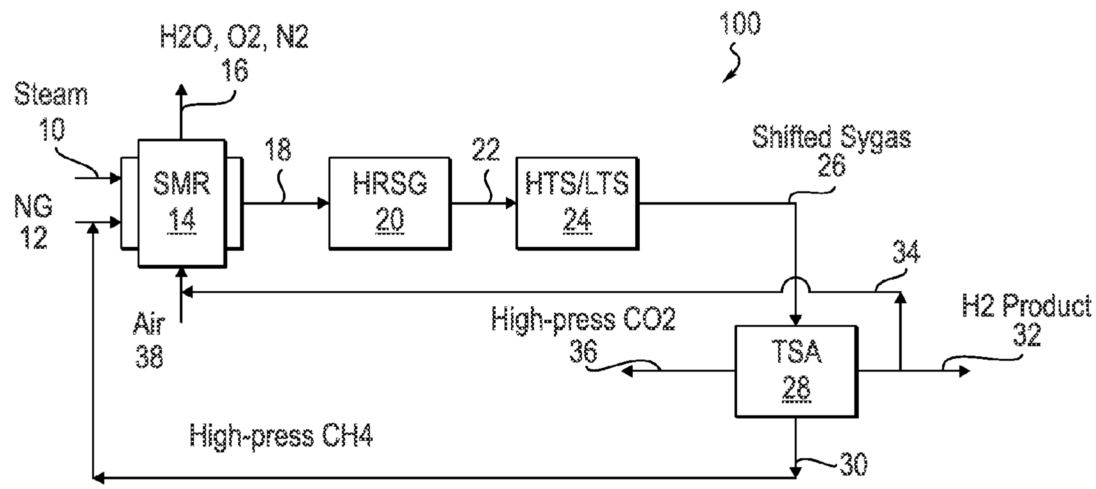
FIG. 1 is a simplified process schematic of the SMR process of the invention.

The general process will be illustrated by reference to FIG. 1. Natural gas 12 and steam 10 at pressures from about 150 psi to about 600 psi and preferably about 300 psi to about 500 psi is reacted in the steam methane reformer 14 to produce a synthesis gas consisting of hydrogen, carbon monoxide, $CO_2$ and unreacted methane, $CH_4$ and $H_2O$. ($CH_4$ and $H_2O \leftrightarrows CO_2+H_2$). The reformed gas containing hydrogen is passed to the HRSG (heat recovery steam generator) via line 18. The carbon monoxide is converted into $H_2$ using a high temperature water gas shift reaction ($CO+H_2O \leftrightarrows CO_2+H_2$). A low temperature water gas shift may also be used to convert remaining CO into hydrogen. A high temperature reaction occurs at from about 350° C. to about 500° C. The low temperature water gas shift occurs at a temperature from about 180° C. to about 250° C. The shifted synthesis gas 26 is fed into a temperature swing adsorption unit 28 via 26. A substantially pure upwards of 99.5 vol % hydrogen product exits the TSA via line 32. Optionally some of the hydrogen can be recycled via line 34 into the steam methane reformer furnace as a fuel along with the introduction of air illustrated as 38. Upon cycling of the TSA, a substantially pure high pressure $CO_2$ stream 36 exits the TSA at pressures 150 psi to about 600 psi and temperatures from about 30° C. to about 300° C. and suitable flow rates. Remaining high pressure methane at a pressure of about 150 psi to 600 psi and temperature about 100° C. to about 300° C. is recycled via line 30 with new makeup natural gas 12 to the SMR unit 14. The sizing and cycling times for the TSA is a function of the volume of gas to be produced.

Figure 2:
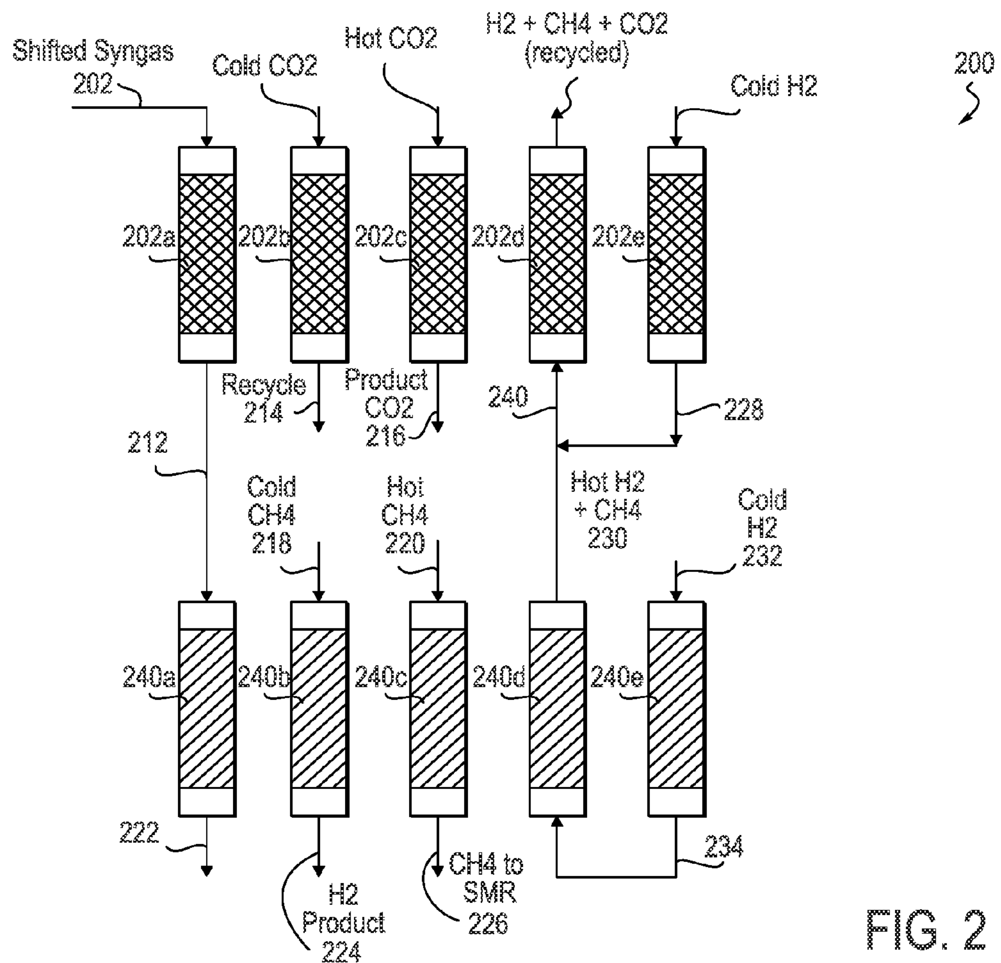
FIG. 2 is a simplified process schematic of the TSA process of the invention.

The particular process for the temperature swing adsorption unit 28 is more clearly illustrated by referring to FIG. 2 where the TSA unit 28 is illustrated as 200 in FIG. 2. The TSA unit 200 has a first section where the shifted syngas 202 enters the first series of beds 202*a*, 202*b*, 202*c*, 202*d* and 202*e*. Upon processing, the gas leaves the first bed 202*a* via line 212 to the second set of beds 240*a* through 240*e* in the second section and exits the TSA unit as a substantially pure fib product via lines 222 and 224. Substantially pure $H_2$ is meant to be greater than 98% preferably greater than 99.5% $H_2$ with balance to 100% of any species that permits the use of the $H_2$ elsewhere in the refinery. The process advances according to a substantially five-step procedure where the shifted syngas 202 is fed to a first section 202*a* which selectively adsorbs $CO_2$ from the syngas. The remaining components $H_2$, $CH_4$, CO, and $N_2$ are sent to the second section of the bed containing a suitable adsorbent. The saturated first bed now consists of captured $CO_2$ plus syngas remaining within the bed voids. The gases remaining in the void space as well as co-adsorbed with $CO_2$ on the adsorbent surface are removed in a rinse step (i.e., a heavy reflux step) in which cold and pure $CO_2$ at high pressure is sent to the bed at temperatures in the range of 20° C.-100° C. preferably in the range 40° C.-70° C. The high-purity $CO_2$ needed for this step (with >95 mol % $CO_2$ concentration) is taken from a portion of the product $CO_2$ stream. Since the concentration of $CO_2$ in the rinse step is higher than that in the feed stream, the $CO_2$ in this step displaces the co-adsorbed components such as CO, $CH_4$, $N_2$ and $H_2$ from the adsorbent and these components are "rinsed" out of the bed. This product gas, which contains CO, $CH_4$, $N_2$, and $H_2$ and small amount of $CO_2$, is recycled as a feed to the first section. Alternatively, this product gas could be mixed with the feed gas going into bed 240*a* in the second section. As another alternative, this product gas could be used as a fuel for heaters and boilers.

Thereafter, the bed now saturated with $CO_2$ is regenerated by sending pure and hot $CO_2$ of temperature in the range of 100° C.-350° C. and pressure in the range 150 psi-600 psi to the bed. At the high temperature of about 100° C.-350° C., $CO_2$ is released from the bed and swept out at high pressure of from about 150 psi to about 600 psi.

The bed can also be heated by applying sufficient voltage across the bed to provide resistive heating, in a process known as electric swing adsorption (ESA). As another alternative, the bed can be heated by applying heat externally to the bed, for example by a heated jacket or oven. A combination of these techniques could also be used to heat the sorbent structure. The hot bed now contains a small amount of $CO_2$ which is removed by sending a hot $H_2$ and $CH_4$ stream product of Step 4, of the second section into the bed.

The gas now exits from bed 202*d* contains primarily $H_2$, $CH_4$, $CO_2$ which thereafter cooling to about 40° C. to about 70° C. is recycled as a feed to the first section of the TSA thus enhancing the overall recovery of $CO_2$. In the first section, the bed 202*d* is now saturated with hot $H_2$ and $CH_4$ occupying the void space, which is cooled in Step 5 by using part of the $H_2$ product. The hot $H_2$ and $CH_4$ stream exiting the bed 202*e* is sent as a feed to bed 202*d* in Step 4, and the bed is now ready to begin again.

The processed gas from the first section flows into the adsorbent bed in the second section. All the impurities $CH_4$, $CO_2$ and $N_2$ are captured and nearly pure $H_2$ is obtained. A portion of the product $H_2$ is used as a fuel to the steam methane reformer.

In the second section, in Step 2, the void gas in the bed is removed by a rinse step in which cold and pure $CH_4$ or natural gas at high pressure is sent to the bed. The impurities in the void space that are rinsed away are adsorbed in the unspent section of the bed and pure $H_2$ is obtained. Thereafter, the bed now saturated with impurities is regenerated by sending pure hot $CH_4$ or natural gas at high pressure. The bed can also be heated by applying sufficient voltage across the bed to provide resistive heating, in a process known as electric swing adsorption (ESA). As another alternative, the bed can be heated by applying heat externally to the bed, for example by a heated jacket or oven. A combination of these techniques could also be used to heat the sorbent structure. At the high temperature of about 100° C. to about 350° C., the $CH_4$ and other impurities are released from the bed and swept out at high pressure. The stream contains a substantial amount of $CH_4$ and is sent as a feed to the reformer. The hot bed now contains a small amount of $CH_4$ which is removed by sending a hot $H_2$ gas stream to the bed. The exit gas now contains primarily $H_2$ and $CH_4$ which is sent as a feed to step 4, in the first section via line 230. Finally, the bed 240*e* in the second section mat is now saturated with hot $H_2$ occupying the void space is cooled to about 30° C. to about 70° C. using pan of the $H_2$ product. The hot $H_2$ gas stream exiting the bed is sent to a feed of Step 4, and the bed is now ready for the process of Step 1 again. Five or more beds in parallel are used to carry out the cyclic TSA process in a continuous manner.

In another embodiment, a part of the gas stream coming out of the first section from 202*d* is sent as a fuel to the steam methane reformer furnace after energy recovery in an expander. The advantage is a less complex process at the expense of release of some $CO_2$ in the furnace exhaust gases. In the above description, cold temperature corresponds to about 30° C. to 70° C. whereas hot temperatures is about 100° C. to 350° C. and the pressure streams are from 150 psi to 600 psi.

In general, the choice of the adsorbent used in the beds in the first and second section depends on the temperature and pressure conditions as well as the type and amount of the component to be removed from the gas stream. The adsorbent can be selected from zeolites, molecular sieves, silica gel, activated alumina, activated carbon or carbon molecular sieves. More than one type of absorbent may be used in a bed. As an example, U.S. Pat. No. 4,171,206 suggested using BPL activated carbon or MSC-V carbon in the first section to remove $CO_2$; whereas a combination of BPL carbon and 5 A molecular sieve zeolite in the second section to remove primarily $CH_2$ and CO and produce high-purity $H_2$ product stream.

EXAMPLE

An example, with other variations possible within the scope of the invention, is given below for producing $H_2$ while recycling $CH_4$ to the SMR as a feed and producing a high pressure purified $CO_2$ stream. In this example, the syngas flow rate after the low-temperature shift reactor, after removing water by condensation at 40° C., is 7000 kmol/h with the following composition (in mol %):

$CO_2$=19%, $H_2$=74.5%, CO=0.5%, $CH_4$=5.5%, $H_2O$=0.3%, $N_2$=0.2%.

This syngas mixture at 27 bar is sent to a TSA unit, which consists of 5 beds in the "first" section and 5 beds in the "second" section. Each bed in the first section is packed with 70 tons of BPL carbon beads. Each bed in the second section is packed with a layer of 45 tons of BPL and 13 tons of 5 A molecular sieves. Each bed has a dimension of approx. 7.5 m diameter and 5 m length.

The process advances according to a five-step procedure in both the first and second sections. Five or more beds are used in the first and second section so that the process is carried out in a continuous fashion.

Step 1a: The shifted syngas 202 is fed to a first section 202*a* for 10 minutes, which selectively adsorbs $CO_2$ from the syngas. The remaining components $H_2$, $CH_4$, CO, and $N_2$ are sent to the second section of the bed. The saturated first bed now consists of captured $CO_2$ pins syngas remaining within the bed voids.

Step 2a: The void gases and co-adsorbed gases are removed In a rinse step (i.e., a heavy reflux step) in which cold and pure $CO_2$ in the range 100 kmol/h-500 kmol/h at high pressure in the range 150 psi-600 psi is sent to the bed at temperatures in the range of 20° C.-100° C. preferably its the range 40° C.-70° C. This step is continued for 10 minutes or till $CO_2$ breaks through the bed, whichever comes first. The product gas is recycled as a feed to the first section. Alternatively, the product gas is recycled as a feed to the second section. As another alternative, this product gas could be used as a fuel for heaters and boilers. The $CO_2$ used for rinsing is preferably obtained from the product exiting Step 3a below.

Step 3a: The bed now saturated with $CO_2$ is regenerated by sending pure and hot $CO_2$ in the range 100 kmol/h-500 kmol/h of temperature in the range of 100° C.-350° C. and pressure in the range 150 psi-600 psi to the bed. This step is continued for 10 minutes.

Step 4a: The hot bed now contains a small amount of $CO_2$ which is removed by sending a hot stream consisting of $H_2$ and $CH_4$ stream product of Step 4b, of the second section into the bed, as well as the stream exiting the Step 5a. This step is continued for 10 minutes. The gas exiting Step 4a after cooling to about 40° C. to about 70° C. is recycled as a feed to the first section of the TSA thus enhancing the overall recovery of $CO_2$.

Step 5a: The bed 202*e* is now saturated with hot $H_2$ and $CH_4$ occupying the void space, which is cooled by using part of the product, in the range of 250 kmol/h-1000 kmol/h. This step is carried out for 10 minutes. The hot $H_2$ and $CH_4$ stream exiting the bed is sent as a feed to Step 4a, and the bed is now ready to begin again the next cycle of the process.

The adsorption/desorption in the second section is carried out according to a five-step process that occurs sequentially.

Step 1b: The processed gas from the first section flows via line 212 into the adsorbent bed 240*a* in the second section for 10 minutes. All the impurities $CH_4$, $CO_2$ and $N_2$ are captured and nearly pure $H_2$ is obtained. A portion of the product $H_2$ is used as a fuel to the steam methane reformer furnace.

Step 2b: The void gas in the bed is removed by a rinse step in which cold and pure $CH_4$ or natural gas of flow rate in the range 100 kmol/h-1000 kmol/h at high pressure in the range 150 psi to 600 psi is sent to the bed. The impurities in the void space that are rinsed away are adsorbed in the unspent section of the bed and pure $H_2$ is obtained. This step is carried out for 10 minutes.

Step 3b: The bed 240*c* is pressurized by sending pure hot $CH_4$ or natural gas at high pressure with flow rate in the range of 100 kmol/h-1000 kmol/h. The pressure of the natural gas is selected such that the gas stream existing bed 240*c*, which is used as a feed to the SMR, is at the required feed pressure. This step is carried out for 10 minutes.

Step 4b: The hot bed now contains a small amount of $CH_4$ which is removed by sending a hot $H_2$ gas stream to the bed for 10 minutes. The hot $H_2$ gas stream exiting bed 240*e* in Step 5b is used for this purpose. This $H_2$ stream may be further heated by steam or some other source prior to entering bed 240*d*. The exit gas now contains primarily $H_2$ and $CH_4$, which is sent as a feed to Step 4a, in the first section via line 230.

Step 5b: The bed 240*e* in the second section that is now saturated with hot $H_2$ occupying the void space is cooled to about 30° C. to about 70° C. by sending part of the $H_2$ product with flow rate in the range 250 kmol/h-1000 kmol/h for 10 minutes. The hot $H_2$ gas stream exiting the bed is sent to a feed of Step 4a, and the bed is now ready for the process of Step 1 again.

Note that the cycle time in the above process is taken as 10 minutes. However, it should be noted that the cycle time is a function of the syngas flow rate, composition, adsorbent bed configuration, nature of the adsorbent and it can vary between 30 sec and 30 minutes or longer.

Also note that in FIG. 2, the streams are shown to enter from the top of the bed: however, any combination of flows, such as co-current and counter-current is possible.

The absorbent cars be filled in the bed as a packed bed, structured or monolithic format. The structured or monolithic configuration for the adsorbent has an advantage of lower pressure drop and faster heat and mass transfer rates, which reduces the bed size. One such example of a structured bed is given in the patent application US 2010/0212495 by Corning Inc., incorporated herein by reference. In that example, the sorbent structure comprises a continuous activated carbon body in the form of a flow-through substrate. The temperature of the sorbent structure can be increased by sending a hot gas stream through it and/or by passing a sufficient voltage across the sorbent structure, to provide resistive heating in a process called as electric swing adsorption (ESA). The advantage of heating the structured bed using resistive heating Is that the amount of hot sweep gas stream can be reduced or eliminated, thus increasing the concentration of the component that is being released from the adsorbent.

The process can be carried out in a Ljungstrom rotating wheel configuration, in which the rotating wheel of a single large adsorber enables the sectionalized adsorbent structures to be exposed to the appropriate gas stream depending on the steps in the cyclic process.

What is claimed is:

1. A process of producing substantially pure $CO_2$ for sequestration or enhanced oil recovery (EOR) and substantially pure hydrogen for use as a fuel in steam methane reformer furnace or as a feed source for other hydrocarbon petrochemical reactions, the process comprises mixing steam and natural gas in a steam methane reformer thereafter passing a product to a heat recovery steam generator and subsequently to high and low-temperature shift reactors to create a shifted synthesis gas which is passed to a temperature swing adsorption (TSA) unit cycled so as to produce a substantially pure $CO_2$ stream at a pressure for sequestration or disposal or EOR and a substantially pure $H_2$ product stream for recycling as a fuel into the steam methane reformer furnace or use in other petroleum and petrochemical operations with any remaining methane recycled with makeup natural gas as feed into the steam methane reformer, and wherein the TSA has a first set of beds to process or produce substantially pure CO2 and a second set of beds to process and produce substantially pure H2 with the rest of any gas stream components being recycled to an SMR or used as fuel gas.

2. The process according to claim 1 wherein an adsorbent for the $CO_2$ is activated carbon, carbon molecular sieves, zeolites and combination thereof.

3. The process according to claim 2 wherein the activated carbon is selected from the group consisting of carbon black, charcoal, and mixtures thereof.

4. The process according to claim 3 wherein the second adsorbing bed consists of activated carbon, carbon molecular sieves, zeolites, and combinations thereof.

5. The process according to the preceding claim 4 wherein the zeolite is selected from the structured shaped group consisting of 4A, 5A, 13X, and combinations thereof.

6. The process according to claim 1 wherein the TSA is operated at a temperature of from about 30° C. to about 350° C., a pressure of about 150 psi to about 600 psi and a cycle time of about 30 sec to 10 minutes.

7. The process according to claim 1 wherein the makeup natural gas and high pressure methane recycle gas is fed to an SMR.

8. The process according to claim 1 wherein a produced $H_2$ is used as a fuel in the application selected from the group consisting of a SMR, heaters, boilers, gas turbine, refinery operation, operations and combinations thereof.

9. A process of producing substantially pure $CO_2$ for sequestration or enhanced oil recovery (EOR) and substantially pure hydrogen for use as a fuel in steam methane reformer furnace or as a feed source for other hydrocarbon petrochemical reactions, the process comprises mixing steam and natural gas in a steam methane reformer thereafter passing a product to a heat recovery steam generator and subsequently to high and low-temperature shift reactors to create a shifted synthesis gas which is passed to a temperature swing adsorption (TSA) unit cycled so as to produce a substantially pure $CO_2$ stream at pressure for sequestration or disposal or EOR and a substantially pure $H_2$ product stream for recycling as a fuel into the steam methane reformer furnace or use in other petroleum and petrochemical operations with any remaining methane recycled with makeup natural gas as feed into the steam methane reformer and wherein the process further includes an auto thermal reformer.

10. The process according to claim 1 used in conjunction with an auto thermal reformer.

11. In a process including a steam methane reformer (SMR) and a temperature swing adsorption (TSA) apparatus, the process which includes operating the TSA in a multi-step process having first and second sections for continuous operations comprising:

feeding shifted syngas into a first reactor for 5 to 20 minutes, which selectively adsorbs $CO_2$ from the syngas, thereafter;

feeding the remaining components $H_2$, $CH_4$, CO and $N_2$ to a second section of a bed wherein a first bed now includes $CO_2$ plus syngas remaining within the bed voids, thereafter;

removing any void gases and co-adsorbed gases in a rinse step in which cold and pure $CO_2$ in the range of 100 kmol/h-500 kmol/h at a pressure in the range 150 psi-600 psi is sent to the bed at temperature in the range of 20° C.-100° C., thereafter;

recycling a product gas as a feed to the first section, thereafter;

feeding substantially pure $CO_2$ in a concentration of 100 kmol/h-500 kmol/h and temperature for 5 to 20 minutes in the range of 100° C.-350° C. and pressure in the range 150 psi-600 psi to the bed, thereafter;

passing a mixture of $H_2$ and $CH_4$ stream from the product of the second section into the first section for 5 to 20 minutes, thereafter;

cooling a gas of the passing step about 40° C. and thereafter recycling as a feed to the first section of the TSA to enhance the overall recovery of $CO_2$ thereafter;

cooling the section saturated with hot $H_2$ and $CH_4$ with a $H_2$ product, in the range of 250 kmol/h for 5 to 20 minutes, and recycling the $H_2$ and $CH_4$ to the preceding step to start the next cycle of the process wherein the hot $H_2$ and $CH_4$ stream exiting the bed is sent as a feed and the bed is now ready to begin a new cycle and during the cycle a second section follows the process steps comprising:

operating a second section of the TSA according to a five-step process that occurs sequentially including passing a processed gas from the first section into the adsorbent in the second section for 5 to 20 minutes to capture the impurities $CH_4$, $CO_2$ and $N_2$ and obtain substantially pure $H_2$ with a portion of the product $H_2$ is used as a fuel to a steam methane reformer furnace, thereafter;

removing the void gas in the bed with a rinse step in which includes $CH_4$ at a flow rate in the range 100 kmol/h-1000 kmol/h at pressure in the range 150 psi to 600 psi to rinse for 5 to 20 minutes, thereafter;

pressurizing the section with $CH_4$ or natural gas flow rate in the range of 100 kmol/h-1000 kmol/h and a pressure of 150 to 600 psi for 5 to 20 minutes, thereafter;

passing H2 into the section to remove $CH_4$ for 5 to 20 minutes $H_2$ and $CH_4$ to a passing step of the first section, thereafter;

cooling the second section saturated with hot $H_2$ occupying the void space to about 30° C. to about 70° C. with additional $H_2$ at flow rate in the range 250 kmol/h-1000h for 5 to 20 minutes wherein the $H_2$ gas is sent as a feed of the a passing step of section one and the bed now is ready for a feeding of the first section to begin another cycle.

12. The process according to claim 11 wherein each step is carried out for about 10 minutes.

13. The process according to claim 9 wherein the produced $H_2$ is used as a fuel in the applications selected from the group consisting of an SMR, heaters, boilers, gas turbines, refinery operations, chemical operations and combinations thereof.

14. The Process according to claim 11 wherein the rinse step of removing the void gases, first occurrence, is in the temperature range 40° C.-70° C. for 5 to 20 minutes.

* * * * *